US005405234A

United States Patent [19]

Ziaylek, Jr. et al.

[11] Patent Number: 5,405,234

[45] Date of Patent: Apr. 11, 1995

[54] PIVOTABLE ARTICLE RETAINING APPARATUS TO INVERT AND STORE A COLLAPSIBLE WATER STORAGE TANK ON A VEHICLE

[76] Inventors: Theodore Ziaylek, Jr., 140 Riverview Dr.; Michael P. Ziaylek, 3 Brook La., both of Yardley, Pa. 19067

[21] Appl. No.: 40,774

[22] Filed: Mar. 31, 1993

[51] Int. Cl.[6] .......... B60R 9/048

[52] U.S. Cl. .......... 414/462; 224/282; 414/680

[58] Field of Search .......... 280/838; 414/462, 552, 414/553, 680, 917; 224/282

[56] References Cited

U.S. PATENT DOCUMENTS

| | | | |
|---|---|---|---|
| 1,695,929 | 12/1928 | Perin . | |
| 1,788,887 | 1/1931 | Cunningham . | |
| 2,005,990 | 6/1935 | Darley . | |
| 2,325,355 | 7/1943 | Yost . | |
| 2,906,557 | 9/1959 | Garahedian et al. . | |
| 3,095,206 | 6/1963 | Fresia et al. . | |
| 3,265,262 | 8/1966 | Metsinger . | |
| 3,612,555 | 3/1971 | Baker . | |
| 4,009,622 | 3/1977 | Hinderks . | |
| 4,059,281 | 11/1977 | Evans . | |
| 4,262,834 | 4/1981 | Nutt | 224/324 |
| 4,645,221 | 2/1987 | Benning . | |
| 4,830,421 | 5/1989 | Hawelka et al. | 296/24.1 |
| 4,911,330 | 3/1990 | Vlaanderen et al. | 222/132 |
| 5,104,280 | 4/1992 | Ziaylek et al. | 414/462 |

*Primary Examiner*—Frank E. Werner

*Assistant Examiner*—Janice L. Krizek

*Attorney, Agent, or Firm*—Sperry, Zoda & Kane

[57] ABSTRACT

An apparatus adapted to be secured to an emergency vehicle such as a fire truck which is adapted to store a collapsible water storage tank and to be moved upwardly to the stored position with the stored tank in the inverted position to facilitate drainage therefrom. The apparatus includes a main bracket secured to the vehicle with a back arm pivotally secured to the main bracket and extending upwardly therefrom and a lower arm pivotally secured to the main bracket and extending outwardly therefrom. A shelf arm is pivotally secured to the distal ends of the lower arm and the back arm to facilitate control and movement thereof. Pivotal connection between the back arm and the shelf arm is made through an actuator drive pin. The actuator drive pin is also pivotally secured with respect to an axially extensible actuator such as an electrically powered piston adapted to facilitate movement of the article retaining apparatus between the stored and lowered positions. An article retaining device is fixedly secured with respect to the lower arm in order to be movable therewith from the lowered position wherein access to the interior thereof is available to the upper position which is the stored position for retaining of the article within an article holding chamber in an inverted fashion. An adjustment capability is included for varying the positioning of the various arms with respect to one another and maintaining alignment thereof.

19 Claims, 5 Drawing Sheets

PIVOTABLE ARTICLE RETAINING APPARATUS TO INVERT AND STORE A COLLAPSIBLE WATER STORAGE TANK ON A VEHICLE

BACKGROUND OF THE INVENTION

1. Field of the Invention

The present invention deals with the field of devices usable for storage of equipment on emergency vehicles. More particularly the present invention is designed to provide a means for storing articles upon a fire truck or the like within very limited space. Often such fire trucks have a shelf area thereon which is no more than ten to fourteen inches wide.

The present invention satisfies a means for storage of portable water tanks often used in rural areas. These portable water tanks are rapidly deployed at the site of a fire by fire truck personnel and are immediately filled extremely quickly by duct valves which pour a great volume of water during a very short amount of time into these tanks to provide a reservoir for firefighters while fighting the rural fire. After the portable water tank is deployed the fire truck will leave the scene to go to a location for re-loading with water.

The present invention provides a means for providing immediate access to such portable water storage tanks located by a fire truck while at the same time providing a means for storage thereof in a remote location thereon in an inverted fashion to facilitate drainage after use.

There are many devices which have been designed for use with fire trucks for efficiently storing fire equipment within limited areas. Fire trucks are called upon to carry an excessive amount of equipment and it is necessary that this equipment be stored within very narrowly confined areas thereon. The present invention provides a means for storing of a collapsible and portable water storage tank within a very narrow area by utilizing an apparatus for moving of the stored water tank from the lowered and available position to the upwardly and stored position in an inverted orientation.

2. Description of the Prior Art

Other prior art devices have been patented for fire equipment storage or for storage of equipment with respect to vehicles or for water tank usage such as those shown in U.S. Pat. No. 1,695,929 patented Dec. 18, 1928 to D. W. Perin and assigned to Perin-Walsh Company on a "Removable Container For Vehicles; and U.S. Pat. No. 1,788,987 patented Jan. 13, 1931 to C. Cunningham on a "Carrier For Transporting And Dispensing Liquids"; and U.S. Pat. No. 2,005,990 patented Jun. 25, 1935 to W. S. Darley on a "Fire Truck"; and U.S. Pat. No. 2,325,355 patented Jul. 27, 1943 to C. F. Yost on "Fire Extinguishing Apparatus"; and U.S. Pat. No. 2,906,557 patented Sep. 29, 1959 to J. Garabedian et al on a "Vehicle Mounted Tank"; and U.S. Pat. No. 3,095,206 patented Jun. 25, 1963 to G. Fresia et al and assigned to Pirelli, S.p.A. of Milan, Italy on a "Flexible Tank Transport Vehicle"; and U.S. Pat. No. 3,265,262 patented Aug. 9, 1966 to A. V. Motsinger on a "Plastic Bag For Carrying Water On Motor Vehicles"; and U.S. Pat. No. 3,612,555 patented Oct. 12, 1971 to C. Baker on a "Transportable Tank Trailer; and U.S. Pat. No. 4,009,622 patented Mar. 1, 1977 to M. Hinderks on a "Collapsible Member"; and U.S. Pat. No. 4,059,281 patented Nov. 22, 1977 to D. Evans and assigned to Towmotor Corporation on a "Mounting Assembly For A Controllably Movable Fluid Tank"; and U.S. Pat. No. 4,262,834 patented Apr. 21, 1981 to W. Nutt and assigned to Teledyne Canada, Limited on a "Ladder Rack"; and U.S. Pat. No. 4,645,221 patented Feb. 24, 1987 to F. Benning and assigned to Deere & Company on an "Arrangement Of A Container On A Vehicle"; and U.S. Pat. No. 4,830,421 patented May 16, 1989 to W. Haweika et al and assigned to Konrad Rosenbauer KG on "Service Vehicles"; and U.S. Pat. No. 4,911,330 patented Mar. 27, 1990 to J. Vlaanderen et al and assigned to Iowa Mold Tooling Company, Inc. on a "Service Vehicle With Dispensing System".

SUMMARY OF THE INVENTION

The present invention provides a pivotable article retaining apparatus adapted to invert and store a collapsible water storage tank with respect to a vehicle which includes a main bracket fixedly secured with respect to the vehicle. This main bracket is generally L-shaped and includes an upper section and a lower base section thereon. Preferably the upper section is perpendicularly oriented with respect to the lower base section. The lower base section itself is preferably fixedly secured with respect to the vehicle.

A back arm is included pivotally secured with respect to the upper section of the main bracket and is movable between a stored position extending upwardly therefrom and a lower position extending generally laterally outward therefrom. An actuator drive pin is pivotally mounted within the back arm means at the distal end thereof from the point of location with respect to the main bracket.

A lower arm is pivotally secured to the lower base section of the main bracket and is movable between a stored position extending upwardly therefrom and a lowered position extending downwardly therefrom. A shelf arm is pivotally secured at the approximate end thereof with respect to the actuator pin and is pivotally secured at the distal end thereof with respect to the lower arm. The shelf arm is movable between the stored position above the main bracket and the lowered position extending outwardly lateral from the main bracket.

An actuator may be included which preferably comprises an electrically powered axially extensive piston which is pivotally mounted at the proximate end thereof with respect to the main bracket. This actuator is also preferably pivotally mounted at the distal end thereof with respect to the actuator drive pin. The actuator device is designed to be axially extensible in order to urge movement of the shelf arm, the lower arm and the back arm to the lowered position and is axially retractable to urge the shelf arm, the lower arm and the back arm to the stored position.

An actuator adjustment device may be included with the present invention which includes an adjustment bracket pivotally attached with respect to the main bracket and positioned in spaced relation from and adjacent to the lower base section thereof. This adjustment bracket defines an adjustment aperture extending therethrough. The actuator is pivotally secured with respect to the adjustment bracket member to be pivotally attached with respect to the main bracket. The adjustment bracket member defines a threaded locking aperture therein. The lower base section of the main bracket defines a threaded locking orifice. An adjustment screw is included extending through the adjustment aperture into abutment with respect to the lower base section of the main bracket. This adjustment screw is movable to adjust the distance between the adjustment bracket member and the actuator with respect to the main bracket. A locking device may be included in order to fix the adjustment bracket with respect to the main bracket to maintain adjustment therebetween. This locking device preferably takes the form of a locking bolt adapted to extend through the threaded locking aperture and the threaded locking orifice in order to fixedly engage the adjustment bracket member with respect to the main bracket. The threaded locking aperture is preferably obliquely oriented with the axis thereof at approximately five degrees inclination with respect to the axis of the adjustment aperture in such a manner as to facilitate the maintenance of adjustment between the adjustment bracket and the main bracket.

A lower plate may be included with the present invention fixedly secured with respect to the lower arm in such a manner as to be movable therewith.

An article retaining device is fixedly secured with respect to this lower plate thus also being fixedly secured with respect to the lower arm to be movable therewith between the stored position and the lowered position. The article retaining device preferably includes an article holding chamber therein adapted to selectively receive and provide an article therein in the lowered position and to retain an article inverted therein in the stored position. The article retaining means includes a lower lip preferably to facilitate retaining of an article within the article holding chamber as desired. The article retaining device is fixedly secured with respect to the lower arm through the lower plate in order to be movable therewith between a lowered position being upright and extending downwardly from said main bracket and a stored position being upside down and extending upwardly from the main bracket. In this manner inverted storage will facilitate drainage of the article held within the article retaining device.

A lower shelf pin is preferably rotatably mounted with respect to the shelf arm. The lower arm is rotatably secured with respect to the lower shelf pin to facilitate pivotal engagement between the shelf arm and the lower arm. The lower shelf pin is selectively removable to facilitate manual movement of the article retaining means between the stored and lowered positions as desired.

A resilient bumper member may be positioned between the article retaining device and the vehicle and be adapted to be resiliently compressible responsive to the article retaining device being in the stored position in order to facilitate the holding of the article retaining means in the stored position as desired.

In a preferred configuration of the design of the present invention the article retaining means will comprise two similarly configured devices as shown best in FIG. 6 and FIG. 3. FIG. 3 shows two such devices spaced apart and adapted to retain therebetween the water storage tank. With this configuration the construction disclosed above will be duplicated on each opposite side of the water storage tank to facilitate movement thereof. With this configuration there will be two main brackets and two back arms along with two actuator drive pins and two lower arms cooperating with two shelf arms and two actuators. The two article retaining means will thereby be each movable with respect to one another to facilitate movement of the water storage tank between the lower and upper position.

It is an object of the present invention to provide a pivotable article retaining apparatus to invert and store a collapsible water storage tank on an emergency vehicle such as a fire truck wherein initial capital outlay for equipment is minimized.

It is an object of the present invention to provide a pivotable article retaining apparatus to invert and store a collapsible water storage tank on an emergency vehicle such as a fire truck wherein maintenance costs are minimized.

It is an object of the present invention to provide a pivotable article retaining apparatus to invert and store a collapsible water storage tank on an emergency vehicle such as a fire truck wherein the total number of moving parts is minimized.

It is an object of the present invention to provide a pivotable article retaining apparatus to invert and store a collapsible water storage tank on an emergency vehicle such as a fire truck wherein maintenance and down time of the apparatus is minimized.

It is an object of the present invention to provide a pivotable article retaining apparatus to invert and store a collapsible water storage tank on an emergency vehicle such as a fire truck wherein storage in the inverted position is facilitated to facilitate drainage and excessive water therefrom.

It is an object of the present invention to provide a pivotable article retaining apparatus to invert and store a collapsible water storage tank on an emergency vehicle such as a fire truck wherein rapid deployment of a water storage tank is achievable.

It is an object of the present invention to provide a pivotable article retaining apparatus to invert and store a collapsible water storage tank on an emergency vehicle such as a fire truck wherein storage of a portable water storage tank within a narrow width area of fourteen inches or less is achievable.

It is an object of the present invention to provide a pivotable article retaining apparatus to invert and store a collapsible water storage tank on an emergency vehicle such as a fire truck wherein usage with many different types of firefighting vehicles is possible.

It is an object of the present invention to provide a pivotable article retaining apparatus to invert and store a collapsible water storage tank on an emergency vehicle such as a fire truck wherein storage of a portable collapsible water tank upon the narrow lateral shelf of a fire truck is greatly facilitated.

It is an object of the present invention to provide a pivotable article retaining apparatus to invert and store a collapsible water storage tank on an emergency vehicle such as a fire truck wherein control of movement of the back arm, lower arm, shelf arm and article retaining device is achieved by a single axially extensible and retractable actuator.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
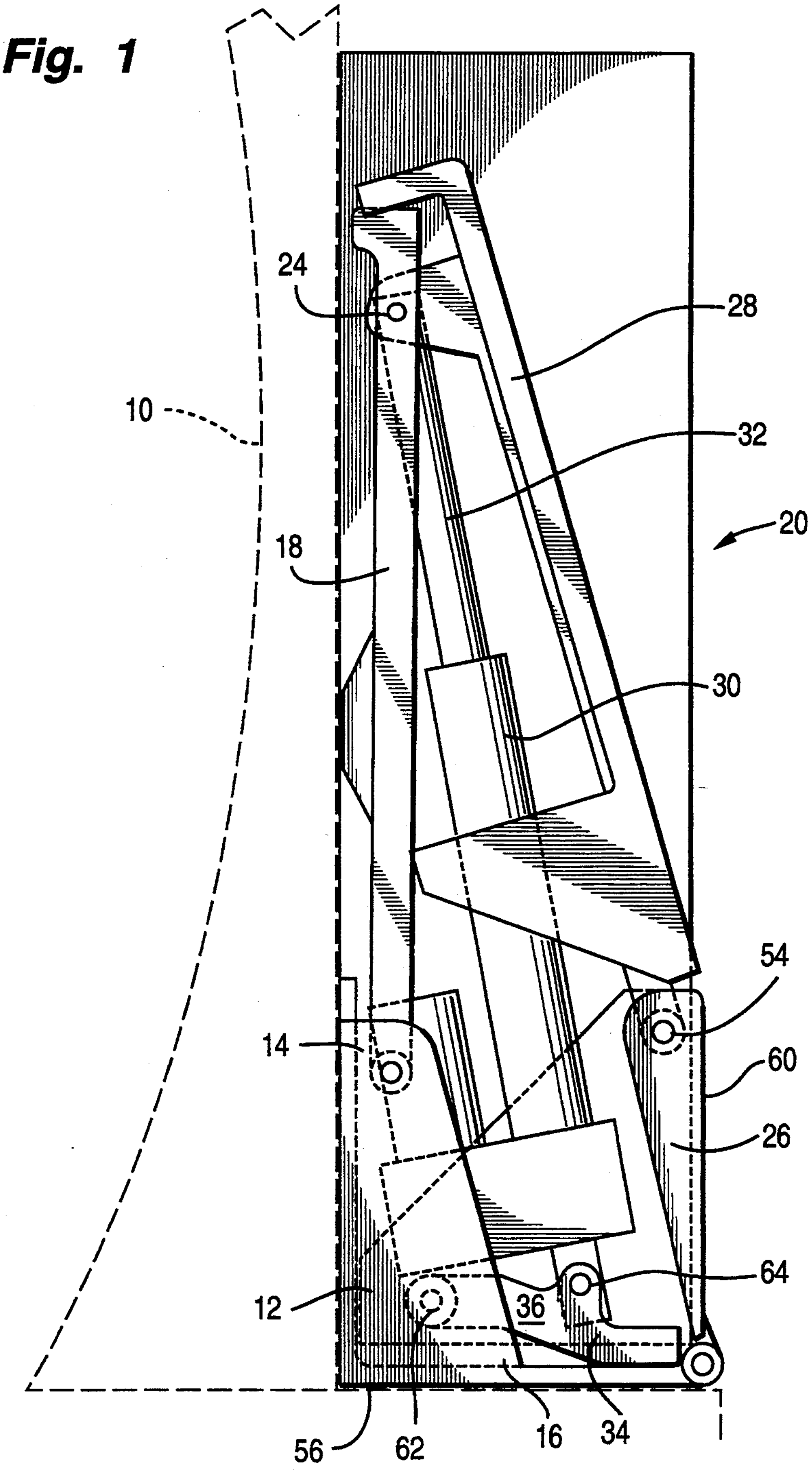
FIG. 1 is a side plan view of an embodiment of the apparatus of the present invention shown in the stored position.

The present invention provides an article retaining apparatus for use with a vehicle 10. The article retaining apparatus is pivotable with respect to the vehicle 10 and is adapted to invert and store emergency equipment with respect to a fire vehicle or other vehicle 10. Such emergency equipment would include a collapsible water storage tank for which the apparatus of the present invention is particularly useful since it is desirable to store such portable water tanks in the collapsed condition in an inverted orientation to facilitate drainage of excess water therefrom.

The pivotable apparatus of the present invention preferably includes an L-shaped main bracket 12 which includes an upper section 14 and a lower base section 16. The lower base section 16 is preferably fixedly secured with respect to the vehicle 10 on a shelf area thereof. However the upper section 14 can also be fixedly secured with respect to vehicle 10 as desired.

A back arm 18 is adapted to be pivotally secured with respect to the upper section 14 of the main bracket 12. The back arm 18 is adapted to extend directly upwardly therefrom when the apparatus of the present invention is in the stored position 20 as shown best in FIGS. 1, 4 and 5. On the other hand the back arm 18 is adapted to extend approximately laterally outward from the point of pivotal securement with respect to the upper section 14 of the main bracket 12 whenever the apparatus of the present invention is in the lowered position 22 wherein the articles stored by the article retaining apparatus of the present invention is available to be deployed or to be restored as shown best in FIGS. 2 and 3.

A lower arm means 26 is pivotally secured with respect to the lower base section 16 of the main bracket 12. This pivotal securement may be made through an interconnecting pin means or any other means for securing the lower arm 26 with respect to the lower base section 16 while allowing pivotal movement of the lower arm 26 with respect thereto. A shelf arm 28 is pivotally secured at the proximate end thereof with respect to the distal end of the back arm 18. The shelf arm 28 is pivotally secured at the distal end thereof with respect to the lower arm 26. Pivotal securement between the shelf arm 28 and the back arm 18 is made through an actuator drive pin 24 which is pivotally movable with respect to both the shelf arm 28 and the back arm 18. This actuator drive pin while providing the pivotable interconnection between these two arms also provides a means for driving of the apparatus of the present invention.

In this overall configuration we see that the main bracket 12 has an upper section 14 and a lower base section 16. The upper section 14 has the back arm pivotally secured thereto. The shelf arm 28 is pivotally secured with respect to the back arm 18. The lower arm 26 is pivotally secured with respect to both the lower base section 16 of the main bracket 12 and the distal end of the shelf arm 28.

An actuator 30 which preferably takes the form of an axially retractable and extendable piston member 32 is pivotally secured with respect to the main bracket 12. The actuator 30 is also pivotally secured at the opposite end thereof with respect to the actuator drive pin 24. As the actuator 30 is powered to retract or extend pulling or pushing force is exerted upon the actuator drive pin 24 which urges the back arm 18 and the shelf arm 28 to move between the stored position 20 and the lowered position 22 as desired.

In order to maintain alignment between the back arm 18, the shelf arm 28, the lower arm 26 and the actuator 30, an actuator adjustment means 34 is included in the present invention. This actuator adjustment means is adapted to vary the relative position between the point of pivotal securement of the actuator 30 with respect to the main bracket 12. By carefully adjusting this distance as desired accurate alignment between the arms and accurate movement of the actuator is achieved.

Figure 2:
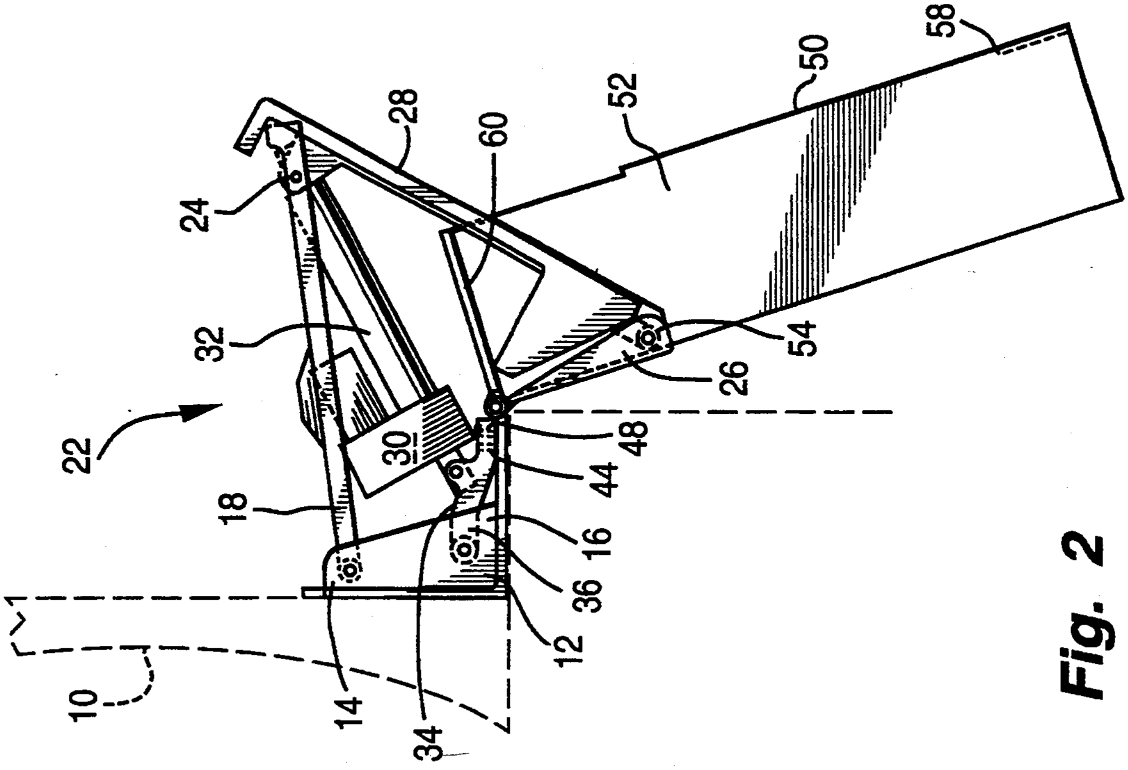
FIG. 2 is a side plan view of the embodiment shown in FIG. 1 in the lowered position.
Figure 7:
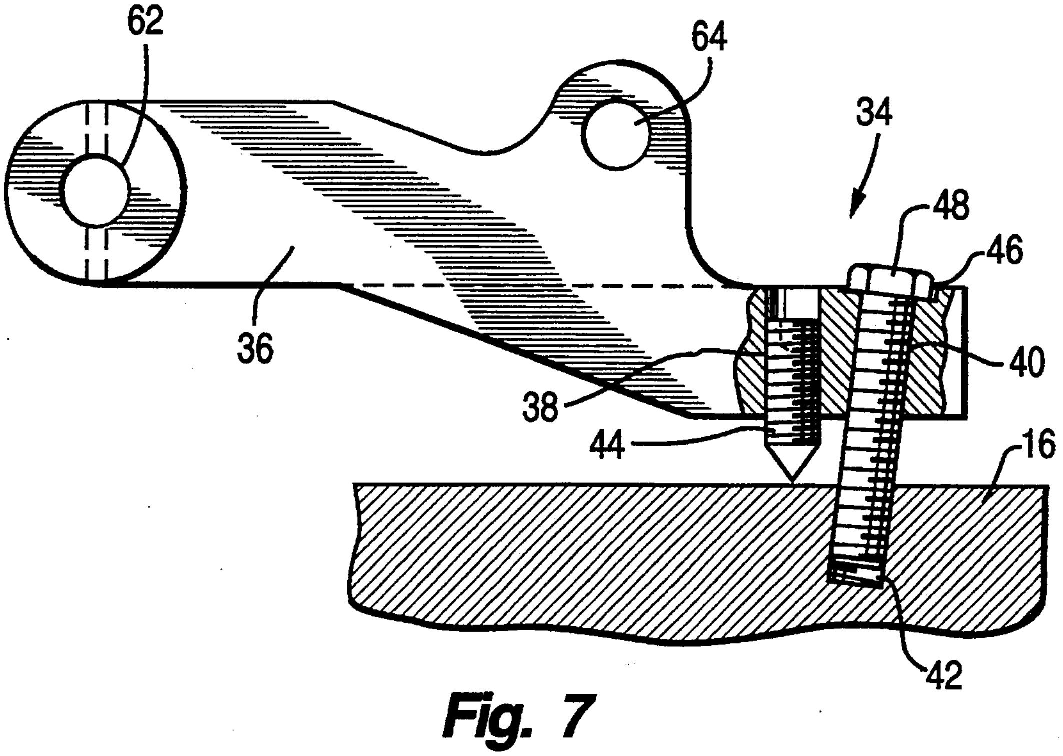
FIG. 7 is a side plan view of an embodiment of the actuator adjustment means of the present invention.
Figure 8:
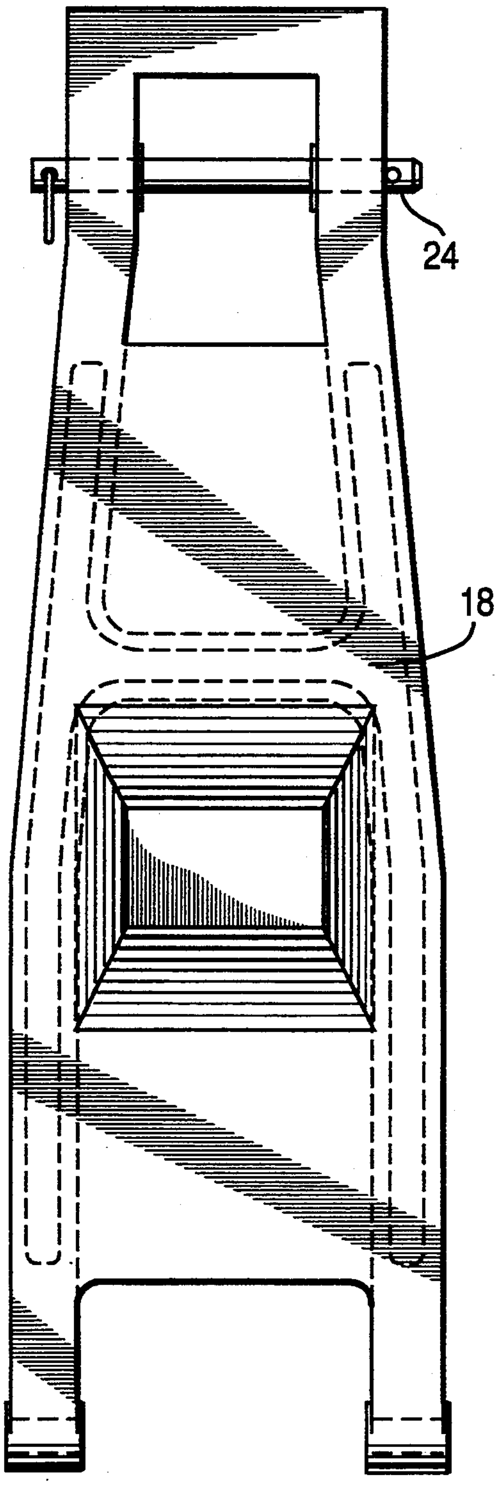
FIG. 8 is a rear plan view of an embodiment of the back arm of the present invention.
Figure 9:
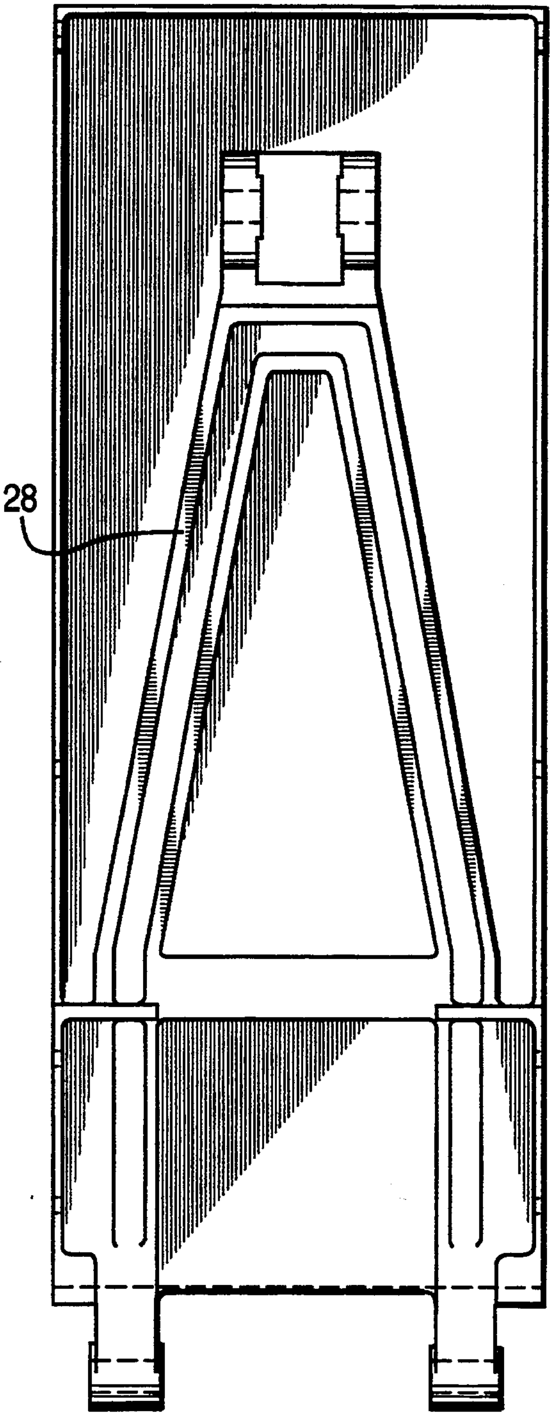
FIG. 9 is a front plan view of an embodiment of a shelf arm of the present invention.

The actuator adjustment means 34 preferably includes an adjustment bracket member 36 shown best in FIGS. 2 and 7. The adjustment bracket 36 is pivotally secured with respect to the main bracket 12 at the central main pin 62. The adjustment bracket member 36 also includes an adjustment pin means 64 extending therethrough which is secured to the proximate end of the actuator 30. In this way the actuator 30 is pivotally secured with respect to the main bracket 12 without being directly secured to the bracket since it is pivotally secured to the adjustment bracket member 36 which itself is pivotally secured to the L-shaped main bracket 12.

The adjustment bracket 36 defines a threaded adjustment aperture 38 extending vertically therethrough as best seen in FIG. 7. Also the adjustment bracket defines a locking aperture 40 which is preferably threaded and extends therethrough adjacent to the adjustment aperture 38 also in a vertical orientation. A threaded locking orifice 42 is defined in the lower base section 16 of the main bracket 12 in registration with the threaded locking aperture 40. A locking means 46 such as a locking bolt 48 is adapted to extend first through the threaded locking aperture 40 and into engagement with respect to the threaded orifice 42 defined in the lower base section 16.

An adjustment screw 44 is adapted to extend through the adjustment aperture 38 to a sufficient distance to be in abutment with respect to the upper surface of the lower base section 16. As such, tightening or loosening of the adjustment screw 44 which preferably is an Allen screw can be achievable to vary the position of the adjustment bracket 36 with respect to the main bracket 12 and thereby vary the relative positioning between the main bracket 12 and the actuator 30. With this adjustment capability orientation between the actuator and the individual moving arms is achievable.

In the configuration of the actuator adjustment means 34 shown in FIG. 7, once the correct adjustment is set by tightening or loosening of the adjustment screw 44 the locking bolt 48 can be tightened thereby locking of the adjustment bracket 36 in position after proper adjustment thereof. In this manner correct adjustment is maintained in relative positioning between the adjustment bracket 36 and the main bracket 12. To further increase engagement once the correct adjusted position is reached by rotation of the adjustment screw 44 it is preferable that the axis of the threaded locking aperture 40 and the threaded locking orifice 42 be slightly inclined at an angle approximately five degrees with respect to the axis of the threaded adjustment aperture 38.

Figure 6:
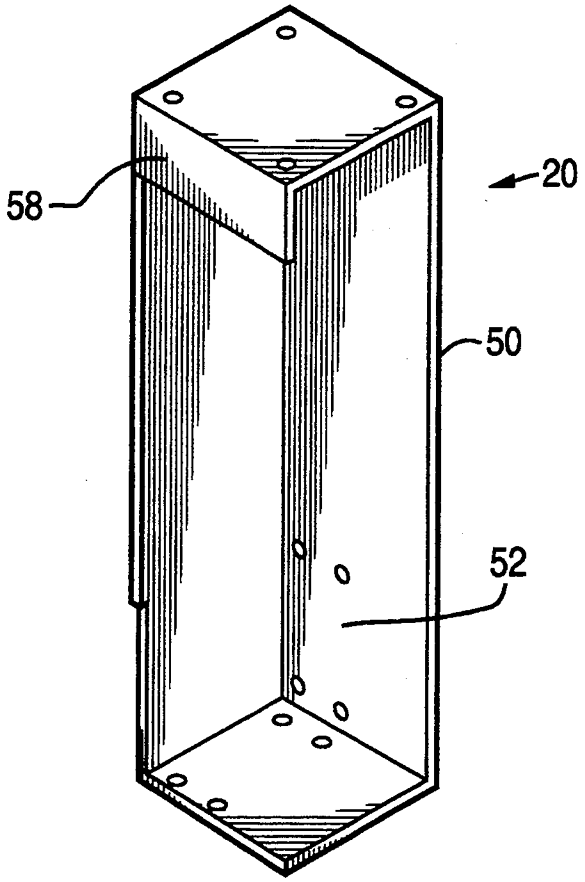
FIG. 6 is an isometric illustration of an embodiment of the article retaining device of the present invention.

The article retaining means 50 of the present invention is adapted to be secured with respect to the lower arm means 26. The article retaining means 50 may preferably take the form of the configuration best shown in FIGS. 6 and 3. In FIG. 6 the box-shaped article retaining means 50 will define an article holding chamber 52 therein. Also an article retaining lip 58 will be positioned adjacent the opening to the article holding chamber 52 to facilitate holding of an article therein during movement between the lowered and stored positions respectively.

The article retaining lip will be below the access opening to the article holding chamber 52 when the article retaining means 50 is in the lowered position 22. On the other hand the article retaining lip 58 will be above the access opening when the article retaining means 50 is in the stored position 20 shown in FIGS. 1, 4 and 5. It is important to understand that the article retaining lip 58 will not inhibit removal of emergency equipment from the article retaining means 50 when in the lowered position 22.

Fixed securement between the article retaining means 50 and the lower arm 26 can be achieved by the inclusion of a lower plate means 60. With lower plate means 60 fixedly secured with respect to the lower arm 26 and fixedly secured with respect to the article retaining device 50 simultaneous movement of the article retaining means with the lower arm can be fully achieved as desired.

Figure 4:
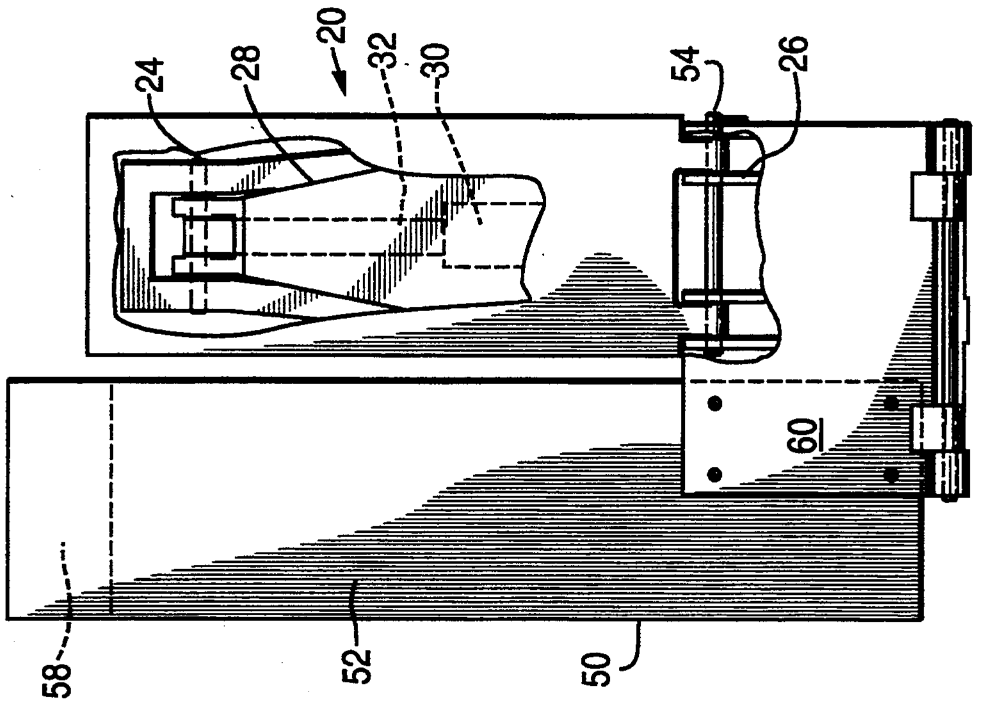
FIG. 4 is a rear plan view of an embodiment of the configuration shown in FIG. 1.
Figure 5:
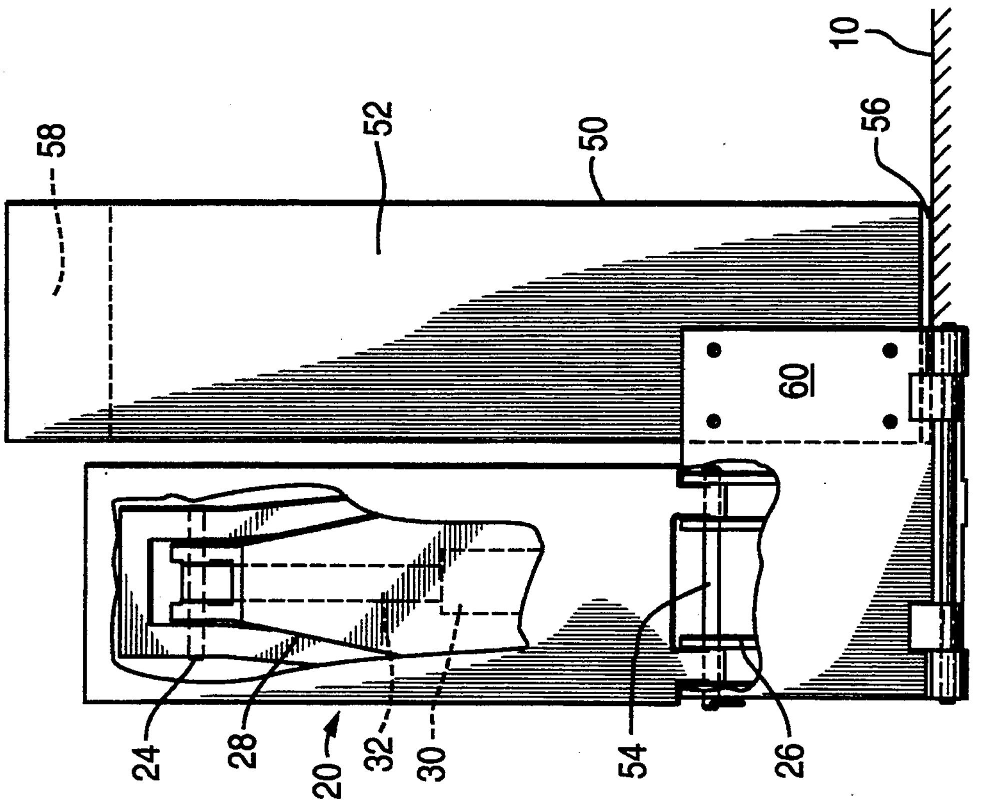
FIG. 5 is a front plan view of the embodiment shown in FIG. 1.

When the article retaining means 50 is moved to the fully stored position 20 as shown best in FIGS. 1, 4 and 5 the article retaining means 50 will be adapted to abut and compress a resilient bumper member 56 as shown in FIG. 5. This compressible bumper will protect the vehicle 10 from damage and will also prevent damage to the emergency article retained within the article retaining means 50 by softening abutting contact of the article retaining means 50 with respect to the vehicle body 10. Also the actuator 30 will be capable of sufficient movement to slightly compress the resilient bumper member 56 to thereby assure firm holding of the article retaining means 50 in the stored position 20 especially during movement of the vehicle 10 from one location to another.

A lower shelf pin means 54 may be included to provide the pivotal mounting of the distal end of the shelf arm 28 with respect to the lower arm 26. Preferably this lower shelf pin 54 as well as the actuator drive pin 24 are removable in order to allow movement of the apparatus of the present invention if power to the actuator means is interrupted. The actuator 30 provides power directly to the actuator drive pin 24 for powering movement of all of the arms of the present invention as well as the article retaining means between the stored and lowered position. If power to the actuator is interrupted it will be possible under the concept of the present invention to remove the actuator drive pin 24 and also possibly remove the lower shelf pin 54 in such a manner as to allow manual rotation of the apparatus of the present invention between the stored and lowered position as desired. It should be understood that this would only be necessary under emergency conditions wherein power to the actuator has been interrupted.

Figure 3:
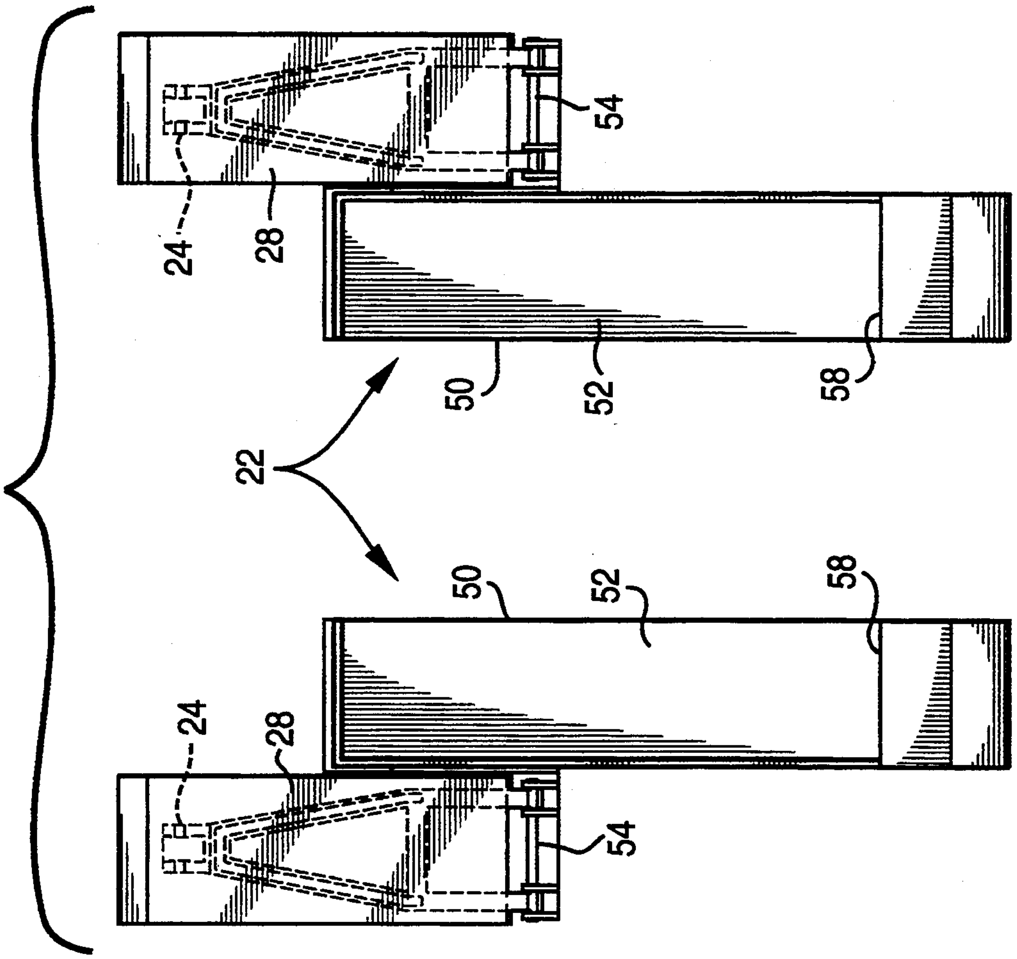
FIG. 3 is a front plan view of an embodiment of the present invention showing two shelf arms and two article retaining members extending downwardly from the side of a fire truck.

In the preferred configuration of the present invention shown in FIG. 3 the article retaining means 50 will comprise two separate article retaining members 50 spaced apart from one another. Each will be operated by a separate actuator drive 24 which is simultaneously powered or de-powered as desired to achieve simultaneous movement of the respective back arms 18, shelf arms 28 and lower arms 26 associated with each individual article retaining device 50. This double apparatus configuration is often preferable when used with rather large water storage tanks of as long as twenty feet or more which would obviously require spacing of twenty feet or more between the opposite article retaining means 50.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A pivotable article retaining apparatus to invert and store a collapsible water storage tank on a vehicle comprising:

A. a main bracket means fixedly attached to a vehicle, said main bracket means including an upper section and a lower base section;

B. a back arm means pivotally secured to said upper section of said main bracket means and being moveable between a stored position extending upwardly therefrom and a lowered position extending laterally outwardly therefrom;

C. an actuator drive pin means pivotally movably mounted within said back arm means;

D. a lower arm means pivotally secured to said lower base section of said main bracket means and being moveable between a stored position extending upwardly therefrom and a lowered position extending downwardly therefrom;

E. a shelf arm means pivotally secured at the proximate end thereof to said actuator drive pin means and pivotally secured at the distal end thereof to said lower arm means, said shelf arm means being moveable between a stored position and a lowered position;

F. an actuator means pivotally mounted at the proximate end thereof to said main bracket means, said actuator means being pivotally mounted at the distal end thereof to said actuator drive pin means, said actuator means being extensible to urge movement of said shelf arm means, said lower arm means and said back arm means between the respective stored and lowered positions thereof;

G. an article retaining means fixedly attached to said lower arm means to be moveable therewith between a stored position and a lowered position, said article retaining means defining an article holding chamber therein adapted to selectively receive and provide an article therein in the lowered position and to retain an article inverted therein in the stored position; and H. an actuator adjustment means comprising:

(1) an adjustment bracket member pivotally attached to said main bracket means and being positioned adjacent to said lower base section, said adjustment bracket member defining an adjustment aperture extending therethrough, said actuator means being pivotally attached to said adjustment bracket member; and (2) an adjustment screw means extending through said adjustment aperture into abutment with said lower base section of said main bracket means, said adjustment screw means being moveable to adjust the distance between said actuator means and said main bracket means.

2. A pivotable article retaining apparatus to invert and store a collapsible water storage tank on a vehicle as defined in claim 1 wherein said actuator adjustment means further comprises a locking means adapted to affix said adjustment bracket member to said main bracket means to maintain adjustment therebetween.

3. A pivotable article retaining apparatus to invert and store a collapsible water storage tank on a vehicle as defined in claim 2 wherein said adjustment bracket member defines a threaded locking aperture therein and wherein said lower base section of said main bracket means defines a threaded locking orifice therein and further wherein said locking means includes a locking bolt means adapted to extend through said threaded locking aperture and said threaded locking orifice to fixedly engage said adjustment bracket member to said main bracket means.

4. A pivotable article retaining apparatus to invert and store a collapsible water storage tank on a vehicle as defined in claim 3 wherein said threaded locking aperture is obliquely oriented with respect to said adjustment aperture to facilitate maintaining of adjustment between said adjustment bracket member and said main bracket means.

5. A pivotable article retaining apparatus to invert and store a collapsible water storage tank on a vehicle as defined in claim 4 wherein the axis of said threaded locking aperture is approximately 5 degrees oblique with respect to the axis of said adjustment aperture.

6. A pivotable article retaining apparatus to invert and store a collapsible water storage tank on a vehicle as defined in claim 1 wherein said actuator means comprises an extensible electrically powered piston means.

7. A pivotable article retaining apparatus to invert and store a collapsible water storage tank on a vehicle as defined in claim 1 wherein said actuator drive pin means is removable to facilitate manual movement of the article retaining means between the stored and the lowered positions.

8. A pivotable article retaining apparatus to invert and store a collapsible water storage tank on a vehicle as defined in claim 1 further comprising a lower shelf pin means rotatably attached to said shelf arm means, said lower arm means being rotatably attached to said lower shelf pin means to facilitate pivotal engagement between said shelf arm means and said lower arm means.

9. A pivotable article retaining apparatus to invert and store a collapsible water storage tank on a vehicle as defined in claim 8 wherein said lower shelf pin means is selectively removable to facilitate manual movement of said article retaining means between the stored and the lowered positions.

10. A pivotable article retaining apparatus to invert and store a collapsible water storage tank on a vehicle as defined in claim 1 wherein said article retaining means includes a lower lip means to facilitate retaining of an article within said article holding chamber therein.

11. A pivotable article retaining apparatus to invert and store a collapsible water storage tank on a vehicle as defined in claim 1 further comprising a resilient bumper member positioned between the article retaining means and the vehicle and being adapted to be compressed responsive to said article retaining means being in the stored position.

12. A pivotable article retaining apparatus to invert and store a collapsible water storage tank on a vehicle as defined in claim 1 wherein said article retaining means is fixedly secured to said lower arm means to be moveable therewith between a lowered position being upright and extending downwardly from said main bracket means and a stored position being upside down and extending upwardly from said main bracket means to facilitate drainage of the article.

13. A pivotable article retaining apparatus to invert and store a collapsible water storage tank on a vehicle as defined in claim 1 wherein said lower arm means and said article retaining means secured thereto are both moveable between a stored position extending upwardly from said main bracket means and a lowered position extending downwardly and outwardly therefrom.

14. A pivotable article retaining apparatus to invert and store a collapsible water storage tank on a vehicle as defined in claim 1 wherein said actuator means is retracted in order to position the article retaining means in the stored position and is extended in order to position the article retaining means in the lowered position.

15. A pivotable article retaining apparatus to invert and store a collapsible water storage tank on a vehicle as defined in claim 14 wherein said actuator means is moveable less than twelve inches.

16. A pivotable article retaining apparatus to invert and store a collapsible water storage tank on a vehicle as defined in claim 1 wherein said upper section and said lower base section of said main bracket means extend perpendicularly with respect to one another.

17. A pivotable article retaining apparatus to invert and store a collapsible water storage tank on a vehicle as defined in claim 1 further comprising a lower plate means fixedly secured to said lower arm means and fixedly secured to said article retaining means for affixing thereof together.

18. A pivotable article retaining apparatus to invert and store a collapsible water storage tank on a vehicle comprising:

A. a main bracket means fixedly attached to a vehicle, said main bracket means being generally L-shaped and including an upper section and a lower base section;

B. a back arm means pivotally secured to said upper section of said main bracket means and being moveable between a stored position extending upwardly therefrom and a lowered position extending laterally outwardly therefrom;

C. an actuator drive pin means pivotally movably mounted within said back arm means;

D. a lower arm means pivotally secured to said lower base section of said main bracket means and being moveable between a stored position extending upwardly therefrom and a lowered position extending downwardly therefrom;

E. a shelf arm means pivotally secured at the proximate end thereof to said actuator drive pin means and pivotally secured at the distal end thereof to said lower arm means, said shelf arm means being moveable between a stored position and a lowered position;

F. an actuator means comprising an electrically powered extensible piston means pivotally mounted at the proximate end thereof to said main bracket means, said actuator means being pivotally mounted at the distal end thereof to said actuator drive pin means, said actuator means being extensible to urge movement of said shelf arm means, said back arm means and said lower arm means to the lowered position and being retractable to urge movement of said shelf arm means, said back arm means and said lower arm means to the stored position;

G. an actuator adjustment means comprising:

(1) an adjustment bracket member pivotally attached to said main bracket means and being positioned adjacent said lower base section, said adjustment bracket member defining an adjustment aperture extending therethrough, said actuator means being pivotally secured to said adjustment bracket member to be pivotally attached to said main bracket means, said adjustment bracket member defining a threaded locking aperture therein, said lower base section of said main bracket means defining a threaded locking orifice therein;

(2) an adjustment screw means extending through said adjustment aperture into abutment with said lower base section of said main bracket means, said adjustment screw means being moveable to adjust the distance between said actuator means and said main bracket means;

(3) a locking means adapted to affix said adjustment bracket member with respect to said main bracket means to maintain adjustment therebetween, said locking means including a locking bolt means adapted to extend through said threaded locking aperture and said threaded locking orifice to fixedly engage said adjustment bracket member to said main bracket means, said threaded locking aperture being obliquely oriented with the axis thereof at approximately five degrees with respect to the axis of said adjustment aperture to facilitate maintaining of adjustment between said adjustment bracket member and said main bracket means;

H. a lower plate means fixedly secured to said lower arm means to be moveable therewith;

I. an article retaining means fixedly attached to said lower plate means and said lower arm means to be moveable therewith between a stored position and a lowered position, said article retaining means defining an article holding chamber therein adapted to selectively receive and provide an article therein in the lowered position and to retain an article inverted therein in the stored position, said article retaining means including a lower lip means to facilitate retaining of an article within said article holding chamber therein, said article retaining means being fixedly secured to said lower arm means to be moveable therewith between a lowered position being upright and extending downwardly from said main bracket means and a stored position being upside down and extending upwardly from said main bracket means to facilitate drainage of the article retained therein;

J. a lower shelf pin means rotatably mounted to said shelf arm means, said lower arm means being rotatably secured to said lower shelf pin means to facilitate pivotal engagement between said shelf arm means and said lower arm means, said lower shelf pin means being selectively removable to facilitate manual movement of said article retaining means between the stored and the lowered positions; and K. a resilient bumper member positioned between the article retaining means and the vehicle and being adapted to be compressed responsive to said article retaining means being in the stored position to facilitate holding of the article retaining means in the stored position.

19. A pivotable article retaining apparatus to invert and store a collapsible water storage tank on a vehicle comprising:

A. a first main bracket means fixedly attached to a vehicle, said first main bracket means including a first upper section and a first lower base section;

B. a first back arm means pivotally secured to said first upper section of said first main bracket means and being moveable between a stored position extending upwardly therefrom and a lowered position extending laterally outwardly therefrom;

C. a first actuator drive pin means pivotally movably mounted within said first back arm means;

D. a first lower arm means pivotally secured to said first lower base section of said first main bracket means and being moveable between a stored position extending upwardly therefrom and a lowered position extending downwardly therefrom;

E. a first shelf arm means pivotally secured at the proximate end thereof to said first actuator drive pin means and pivotally secured at the distal end thereof to said first lower arm means, said first shelf arm means being moveable between a stored position and a lowered position;

F. a first actuator means pivotally mounted at the proximate end thereof to said first main bracket means, said first actuator means being pivotally mounted at the distal end thereof to said first actuator drive pin means, said first actuator means being extensible to urge movement of said first shelf arm means, said first lower arm means and said first back arm means between the respective stored and lowered positions thereof;

G. a first article retaining means fixedly secured to said first lower arm means to be moveable therewith between a stored position and a lowered position, said first article retaining means defining a first article holding chamber therein adapted to selectively receive and provide an article therein in the lowered position and to retain an article inverted therein in the stored position;

H. a second main bracket means fixedly secured to a vehicle at a position spatially disposed from said first main bracket means, said second main bracket means including a second upper section and a second lower base section;

I. a second back arm means pivotally secured to said second upper section of said second main bracket means and being moveable between a stored position extending upwardly therefrom and a lowered position extending laterally outwardly therefrom;

J. a second actuator drive pin means pivotally movably mounted within said second back arm means;

K. a second lower arm means pivotally secured to said second lower base section of said second main bracket means and being moveable between a stored position extending upwardly therefrom and a lowered position extending downwardly therefrom;

L. a second shelf arm means pivotally secured at the proximate end thereof to said second actuator drive pin means and pivotally secured at the distal end thereof to said second lower arm means, said second shelf arm means being moveable between a stored position and a lowered position;

M. a second actuator means pivotally mounted at the proximate end thereof to said second main bracket means, said second actuator means being pivotally mounted at the distal end thereof to said second actuator drive pin means, said second actuator means being extensible to urge movement of said second shelf arm means, said second lower arm means and said second back arm means between the respective stored and lowered positions thereof; and N. a second article retaining means fixedly secured to said second lower arm means to be moveable therewith between a stored position and a lowered position, said second article retaining means defining a second article holding chamber positioned immediately adjacent said first article holding chamber and cooperating therewith to selectively receive and provide an article therein in the lowered position and to retain an article inverted therein in the stored position;

O. a first actuator adjustment means comprising:

(1) an first adjustment bracket member pivotally attached to said first main bracket means and being positioned adjacent to said first lower base section, said first adjustment bracket member defining a first adjustment aperture extending therethrough, said first actuator means being pivotally attached to said first adjustment bracket member;

(2) a first adjustment screw means extending through said first adjustment aperture into abutment with said first lower base section of said first main bracket means, said first adjustment screw means being moveable to adjust the distance between said first actuator means and said first main bracket means; and P. a second actuator adjustment means comprising:

(1) an second adjustment bracket member pivotally attached to said second main bracket means and being positioned adjacent to said second lower base section, said second adjustment bracket member defining a second adjustment aperture extending therethrough, said second actuator means being pivotally attached to said second adjustment bracket member; and (2) a second adjustment screw means extending through said second adjustment aperture into abutment with said second lower base section of said second main bracket means, said second adjustment screw means being moveable to adjust the distance between said second actuator means and said second main bracket means.

* * * * *